United States Patent [19]

Uchidoi et al.

[11] 4,370,037

[45] * Jan. 25, 1983

[54] DIGITAL CONTROL CAMERA

[75] Inventors: Masanori Uchidoi, Yokohama; Tomonori Iwashita, Fuchu; Tetsuya Taguchi, Kawasaki; Yukio Iura, Yokosuka; Toshikazu Ichiyanagi, Tokyo; Hiroshi Aizawa, Machida, all of Japan

[73] Assignee: Canon Kabushiki Kaisha, Tokyo, Japan

[*] Notice: The portion of the term of this patent subsequent to Nov. 25, 1997, has been disclaimed.

[21] Appl. No.: 21,188

[22] Filed: Mar. 16, 1979

Related U.S. Application Data

[63] Continuation of Ser. No. 733,794, Oct. 19, 1976, Pat. No. 4,265,521.

[30] Foreign Application Priority Data

Oct. 21, 1975 [JP] Japan .................................. 50-126559

[51] Int. Cl.³ .............................................. G03B 9/08
[52] U.S. Cl. ................................... 354/23 D; 354/50; 354/238

[58] Field of Search .................... 354/23 D, 29.30, 43, 354/50, 53, 60 R, 60 L, 238, 239, 267, 268, 271; 250/201, 206

[56] References Cited

U.S. PATENT DOCUMENTS

| | | | |
|---|---|---|---|
| 3,956,758 | 5/1976 | Numata et al. | 354/53 |
| 4,019,189 | 4/1977 | Kitai et al. | 354/238 |
| 4,025,929 | 5/1977 | Saito | 354/50 |
| 4,038,675 | 7/1977 | Kitai et al. | 354/238 |
| 4,235,538 | 11/1980 | Uchidoi et al. | 354/23 D |
| 4,265,521 | 5/1981 | Uchidoi et al. | 354/23 D |

*Primary Examiner*—Stafford D. Schreyer
*Attorney, Agent, or Firm*—Toren, McGeady and Stanger

[57] ABSTRACT

A camera having an exposure control device or, more particularly, having a digital control circuit for controlling exposure. Sequence control over a photographing operation and control over a display operation are both accomplished by the same sequence control circuit, which is simplified and yet permits selection between self-timer photographing and ordinary photographing operations.

15 Claims, 9 Drawing Figures

F I G. 4
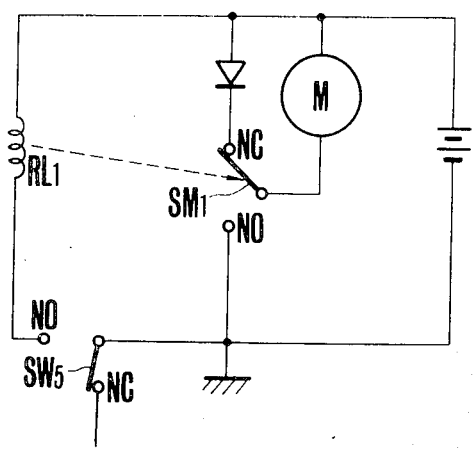
F I G. 5
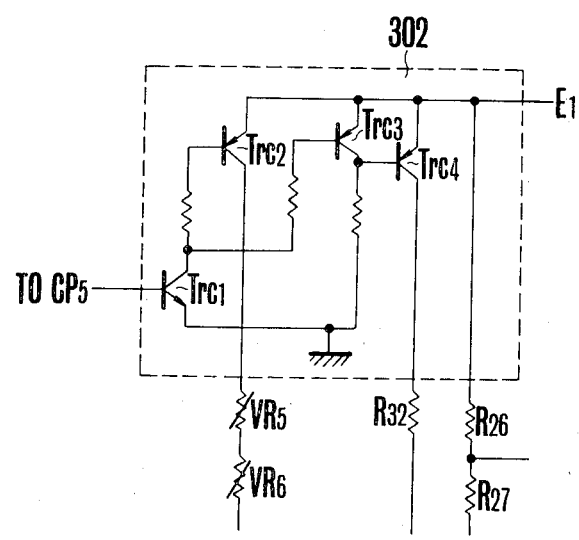

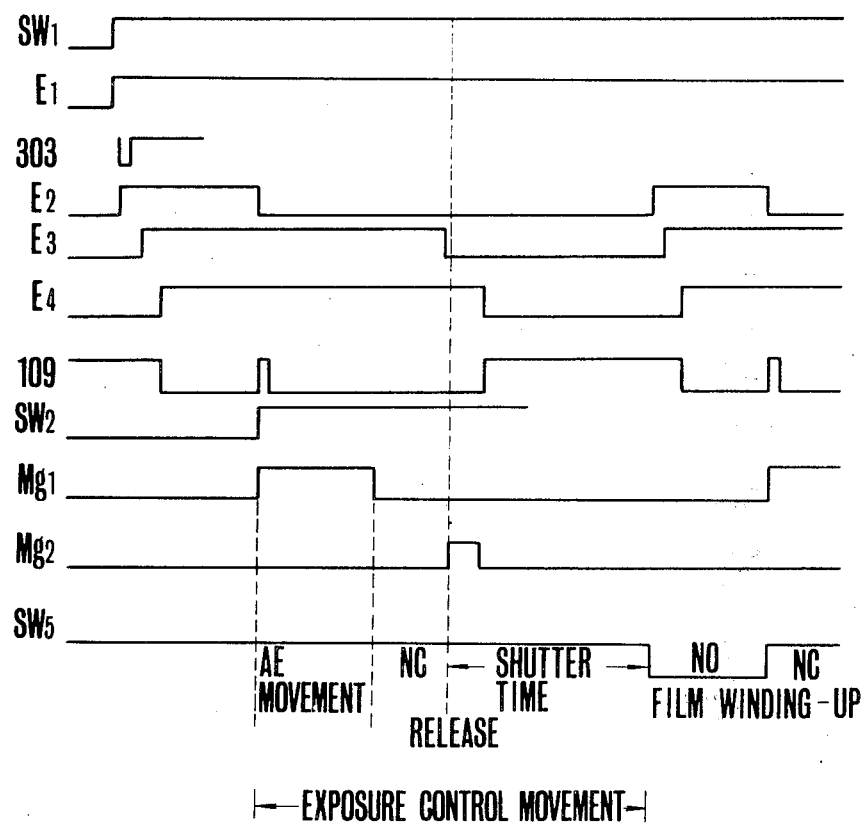

DIGITAL CONTROL CAMERA

This is a continuation of application Ser. No. 733,794 filed on Oct. 19, 1976 now U.S. Pat. No. 4,265,521.

FIELD OF THE INVENTION

This invention relates to a camera equipped with a digital control circuit which controls the camera to perform various photographing actions one after another.

DESCRIPTION OF THE PRIOR ART

Heretofore, a camera of a type to perform a sequence control of photographing actions in time sequence by means of a digital circuit according to a counted value derived from a counter or the like which counts pulses has been known. In the conventional sequence control camera, the photographing actions from the start to the end of photographing are controlled by allowing the counter to begin the counting operation from a cleared or preset state thereof. Therefore, both a display action and the timing for photographing actions must be controlled according to the value counted by the same counter. The counter, therefore, must produce a control signal for display and, in addition thereto, another control signal required for photographing actions. For this, the counter of the conventional camera of this type has been arranged to have a capacity of many bits. Furthermore, in the conventional sequence control camera, every photographing action is controlled by an electrical signal. The control, therefore, cannot be performed when the voltage of a power source drops. That is a shortcoming of the conventional camera. Another shortcoming of the conventional sequence control camera lies in that, in order to permit self-timer photographing, an extremely complex control circuit must be used for the camera, because the length of time from the start through the end of photographing is fixed for performing control actions in time sequence.

SUMMARY OF THE INVENTION

It is an object of this invention to provide a digital control camera which uses a single counter of a small number of bits for controlling a display action as well as photographing actions.

It is another object of this invention to provide a digital control camera which stops the sequence control performed through a counter when the voltage of a power source drops, so that the sequence control can be prevented from performing erroneous control actions.

It is still another object of this invention to provide a digital control camera which permits self-timer photographing with an extremely simplified arrangement.

These and other objects and features of this invention will become apparent from the following detailed description when the same is read in connection with the accompanying drawings.

BRIEF DESCRIPTION OF THE DRAWINGS

FIG. 4 is a circuit diagram illustrating, as an example, the details of a motor drive device shown in FIG. 1.

FIG. 5 is a circuit diagram illustrating, as an example, the details of a switching circuit 302 indicated in FIG. 2.

FIG. 7 is a timing chart illustrating the operations of the arrangements shown in FIGS. 2 and 3.

DESCRIPTION OF EMBODIMENTS OF THE INVENTION

Figure 1:
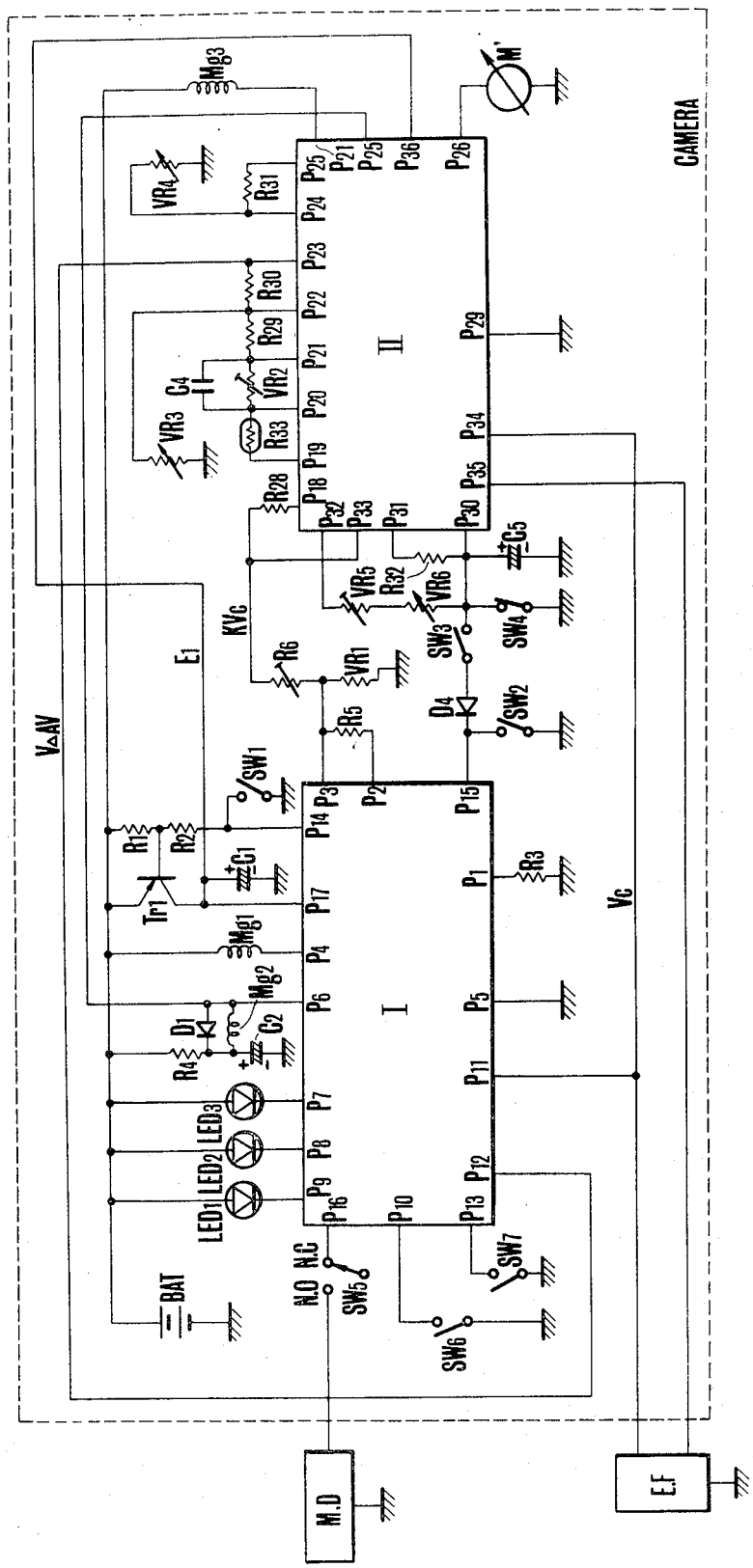
FIG. 1 is a block diagram illustrating an embodiment of the digital control camera of the present invention.

The details of the present invention will be understood from the following description given referring to the accompanying drawings:

In FIG. 1 which is a block diagram illustrating an embodiment of the digital control camera of the invention, a part enclosed with a dotted line represents a circuit arrangement to be placed inside a camera body. A block MD indicates an electric motor drive device and another block EF an electronic flash device. The devices MD and EF are mounted on the camera as required. In the circuit arrangement of the camera, a block I represents an integrated circut (LSI) constituting a sequence control part and an automatic exosure control part. The reference numerals P1-P17 indicate the input and output terminals of the integrated circuit I and terminals provided for connecting various parts to be mounted on the outside.

Another block II represents an integrated circuit (LSI) forming a light measuring part, a computing part and a shutter time control part. The circuit II is provided with terminals P18 through P36 including input and output terminals and terminals for connecting various parts to be mounted on the outside. The reference symbol M' indicates an information indicating meter; Mg1, Mg2 and Mg3 respectively indicate electromagnets; Tr1 indicates a transistor of a holding circuit provided for holding a power supply from a power source; LED1-LED3 indicate light emitting diodes provided for display; SW1 through SW7 indicate switches; VR1 through VR6 indicate variable resistance provided for setting information; and BAT indicates a power source battery. The switch SW1 is interlocked with an unillustrated shutter release button to be turned on by the first stroke of a shutter release operation; the switch SW2 is turned on by the second stroke of the shutter release operation; the switch SW3 is interlocked with an unillustrated operating member to be turned on for bulb exposure; the switch SW4 is provided for counting and is interlocked with a shutter to be turned off when the shutter is opened; the switch SW6 is provided for automatic/manual photographing selection and is interlocked with an unillustrated photographing mode selecting member to be turned on for manual photographing; and the switch SW7 is interlocked with an unillustrated self-timer selecting member to be turned on for use of a self-timer. The switch SW5 is provided for photographing with the electric motor device MD to permit selection between a film winding operation and the photographing operation. The switch SW5 is shifted to a position NC upon completion of the film winding operation and to another position NO upon completion of the travel of the rear diaphragm of the shutter. The magnet Mg1 is provided for automatic exposure control. The magnet Mg2 is provided for starting a camera operation and the magnet Mg3 for shutter time control.

In the camera illustrated in FIG. 1, the light measuring operation, the computing operation and the shutter time control operation are analogically performed by the circuit element I; while a lens stop control operation for automatic exposure and the sequential control for various photographing modes are digitally performed by the circuit element II. The details of these operations will be understood from the following description of FIGS. 2 and 3.

Figure 2:
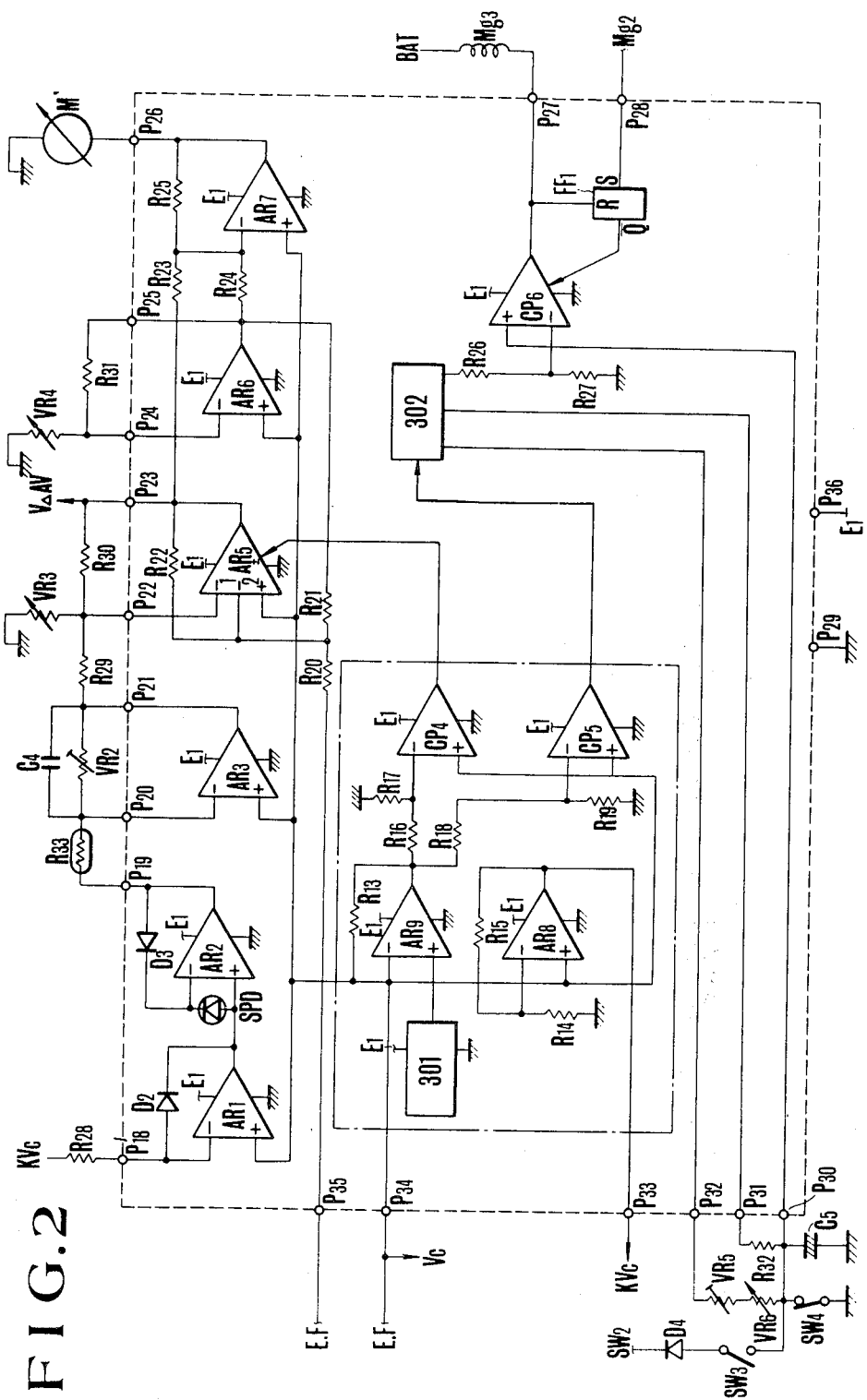
FIG. 2 is a circuit diagram illustrating, as an example, a light measuring part, a computing part and a shutter time controlling part employed in the camera illustrated in FIG. 1.

Referring to FIG. 2, which is a circuit diagram illustrating, as an example, the light measuring, computing and shutter time control parts of the camera of the present invention, the part II enclosed with a dotted line is composed of an integrated circuit such as a LSI. The terminals P18 through P36 are provided for connection of parts to be mounted on the outside and connection to a power source as well as for input and output. In FIG. 2, reference symbols AR1 through AR9 indicate operational amplifier and CP4 through CP6 indicate comparators. The operational amplifier AR5 and the comparator CP6 are controlled by control signal inputs (indicated by arrows). A reference numeral 301 indicates a constant voltage source; 302 indicates a switching circuit; SPD indicates a silicon photo diode for light measurement; and D3 indicates a log diode which is provided for obtaining a logarithmically suppressed characteristic. A reference symbol R33 shown as an outside part indicates a posistor; C4 and VR2 indicate a circuit which is provided for eliminating rapid variation caused by the flicker of a light source illuminating a photographing object; VR3 indicates a variable resistance which is provided for setting shutter time information and film sensitivity information and which is interlocked with an unillustrated shutter dial and a film sensitivity setting dial to have its value of resistance set in response to the operation of these dials; VR4 indicates a variable resistance which is provided for input of information on the compensation for full-open F number of a lens; M' indicates a meter for display; VR6 indicates a variable resistance which is provided for setting shutter time and is interlocked with an unillustrated shutter dial; R32 indicates a resistance which possesses a resistance value corresponding to a shutter time that is preset for flash photographing; and C5 indicates a capacitor of a time constant circuit.

Figure 6:
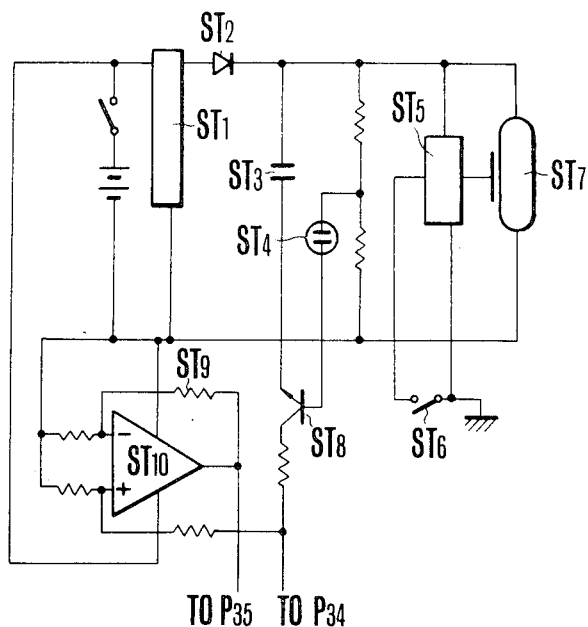
FIG. 6 is a circuit diagram illustrating, as an example, a strobo device indicated in FIG. 2.

With the operational amplifier AR9 provided, when the strobo device has been charged, the electric current flowing through the resistance R13 increases and the output of the resistance reaches a high voltage value to cause the comparison circuit CP4 and CP5 to invert its output from "1" (a high level signal) to "0" (a low level signal); and thereby the operational amplifier AR5 and the position of the switching circuit 302 are shifted. FIG. 6 illustrates, as an example, a strobo device to be connected to the circuit arrangement of FIG. 2. In FIG. 6, the reference symbol ST1 indicates a booster circuit; ST2 indicates a diode provided for rectifying the output of the booster circuit ST1; ST3 indicates a main capacitor; ST4 indicates a neon tube; ST5 indicates a trigger; ST6 indicates a synchro switch; ST7 indicates a discharge tube; ST8 indicates a transistor; ST9 indicates a resistance which has a resistance value corresponding to the lens stop value for flash photographing; and ST10 indicates an operational amplifier. The circuit arrangement illustrated in FIG. 2 operates in the following manner:

When the switch SW1 is turned on in response to a shutter releasing operation, the transistor Tr1 is turned on thereby. A voltage E1 is applied between the terminals P36 and P29 to bring the circuit into an operative state. The photovoltaic element SPD then generates a photo current corresponding to the brightness of a photographing object. The photo current is suppressed through a logarithmic suppression circuit which is composed of the operational amplifier AR2 and the diode D3. The logarithmic suppression circuit produces a voltage output corresponding to a logarithmically suppressed information value Bv of the brightness. This output is supplied to the operational amplifier AR3 through the posistor R33. The high frequency component in the output of the logarithmic suppression circuit is attenuated by the operational amplifier AR3 and also by the capacitor C4 and the resistance VR2. By this, the variation of the output of the logarithmic suppression circuit caused by the fluctuation or flicker of the incident light is eliminated to make the output constant in relation to the brightness. The output corresponding to the brightness information value Bv is supplied to the inversion input terminal 1 of the operational amplifier through the resistance R29. On the other hand, the resistance VR3 at which the shutter time information Tv and the film sensitivity information Sv are set is connected to this terminal of the operational amplifier AR5. Therefore, the information values Tv and Sv and the above stated output of the operational amplifier AR3 are computed at the operational amplifier AR5. Then, the operational amplifier AR5 produces an output information VΔAv on the number of lens stopping steps, i.e. information as to by how many steps the aperture is to be stopped down from a full open lens aperture. The output information VΔAv of the operational amplifier AR5 is taken out from the terminal P23 and is transferred to the sequence control and automatic exposure control circuit I shown in FIG. 1. The information on the number of stopping steps VΔAv is combined by the operational amplifier AR7 with the output of the operational amplifier AR6 derived from the information on the full open F-number of the lens Avo, i.e. the maximum aperture value of the lens, which is set at the resistance VR4. By this, the operational amplifier AR7 produces an output information corresponding to the stop value, i.e. actual lens stop value information Av. This information is displayed, for example, inside the view finder or the like by a stop value display meter M'.

With the shutter starting magnet Mg2 excited, as will be described hereinafter, a "0" signal is supplied to a set terminal of a flip-flop circuit FF1 to set the flip-flop circuit; and then the output $\bar{Q}$ changes from "1" to "0". This causes the comparator CP6 to operate. Then, the comparator CP6 produces a "0" signal, which excites the magnet Mg3 to hold the rear diaphragm of the shutter. When the output of the capacitor CP6 reaches a preset voltage value, the comparator CP6 is inverted thereby to produce a "1" signal. This demagnetizes the magnet Mg3 to allow the rear diaphragm of the shutter to travel. At the same time, the flip-flop circuit FF1 is reset by a building-up signal produced when the output of the comparator CP6 changes from "0" to "1"; and the output $\bar{Q}$ changes from "0" to "1", and the output of Q changes from "0" to "1" to render the comparator CP6 inoperative again. Furthermore, the part enclosed with a chain line represents a flash photographing selection circuit. When a strobo device is used, that is, when the main capacitor ST3 of the flash device is charged, the current flowing through the resistance R13 (FIG. 2) also increases. Then, the output of the operational amplifier AR9 is thus made to be greater than the value for ordinary photographing. This inverts the comparison circuit CP4 and CP5 to change its output from "1" to "0" and to change a signal applied to an input terminal I of the operational amplifier AR5 from "1" to "0". By this, the inversion input terminal of the operational amplifier AR5 is changed from 1 to 2. Then, using the brightness information normally supplied to the input terminal I of the operational amplifier AR5, the output of the amplifier AR5 is controlled by the flash photographing information which is derived from the operational amplifier AR5. At the same time, an input signal to the switching circuit 302 is also changed from "1" to "0". Then, transistors Trc1, Trc2 and Trc3 which are indicated in the details of the switching circuit 302 and which are normally on are turned off by this; while a transistor Trc4 which is normally off is turned on and, from resistances VR5 and VR6 connected to the capacitor C5, a resistance R32 which has a resistance value corresponding to a preset shutter time for flash photographing is selected to form a time constant circuit together with the capacitor C5.

Figure 3:
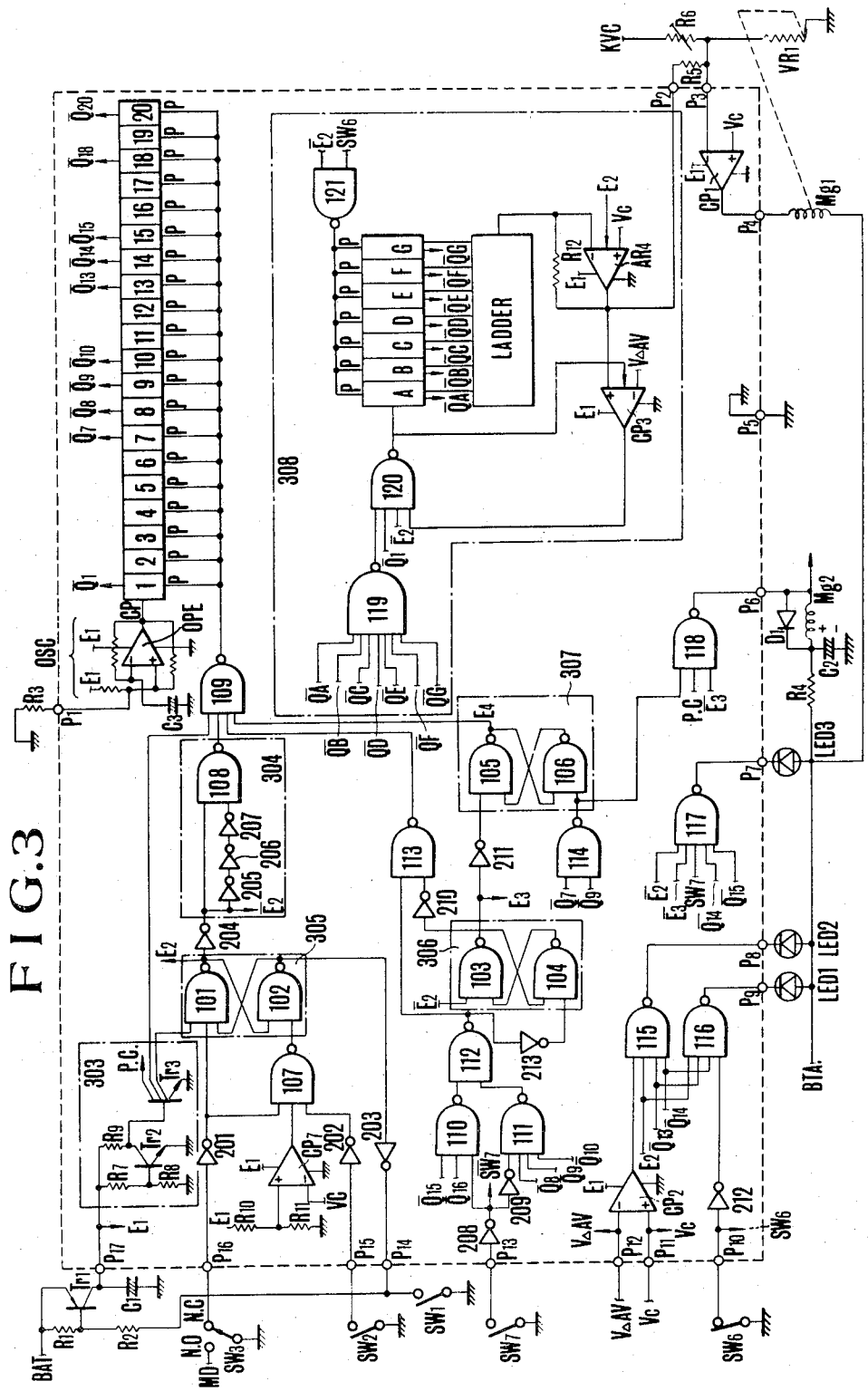
FIG. 3 is a circuit diagram illustrating, as an example, the details of a circuit I shown in FIG. 1.

FIG. 3 is a circuit diagram illustrating the details of a part of the circuit arrangement shown in FIG. 1. In FIG. 3, the sequence control part and the automatic exposure control part of the invention are illustrated as an embodiment example. The part of FIG. 3 enclosed with a dotted line is composed of a LSI. The circuit is arranged as a digital control circuit. The LSI is provided with terminals P1 through P17 to which exterior mounting parts and circuits are connected respectively. The reference numerals 1 through 20 represent a binary counter. F reference numeral P indicates a preset input terminal; $\bar{Q}$-Q9-$\bar{Q}$20 indicate output terminals; and CP indicates a clock pulse input terminal. When the input terminal P has an input of logic "1", the output of the output terminal Qn becomes "1" and that of the output terminal $\bar{Q}n$ becomes "0". A reference symbol OSC indicates a clock pulse oscillator which is composed of a resistance R3, a capacitor C3 and an operational amplifier PE and which produces clock pulses of a frequency to be determined by the time constant of the resistance R3 and capacitor C3. A reference numeral 308 indicates an AD-DA converter. Reference symbols A through G represent another binary counter; and LAD indicates a resistance circuit network. A reference numeral 303 indicates a power up clear circuit; 304 indicates a one shot circuit; 305, 306 and 307 respectively indicate flip-flop circuits; 101 through 121 indicate a NAND gate; 201 through 213 indicate an inverter; AR4 indicates operational amplifier; and CP1, CP2, CP3 and CP7 indicate comparators.

FIG. 4 illustrates, as an example, the motor drive device indicated in FIG. 1. In FIG. 4, a reference symbol M indicates a motor; RL1 indicates a relay; and SM1 indicates a switch which is interlocked with the relay RL1 and is normally connected to one side NC of the switch.

FIG. 7 is a time chart illustrating the operations of FIG. 1 through FIG. 3.

Figure 8:
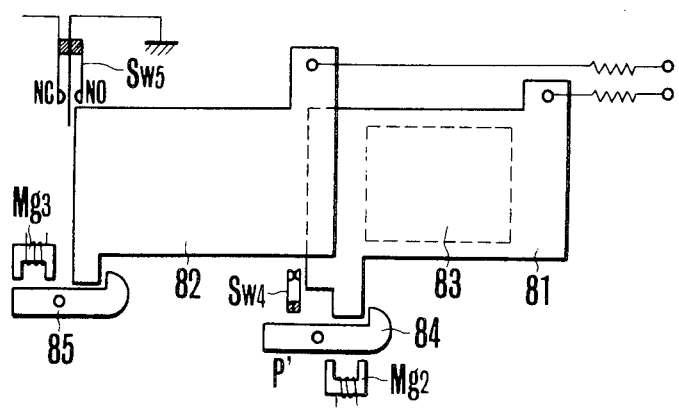
FIG. 8 is a schematic diagram illustrating the relation of a shutter to a switch SW5 indicated in FIGS. 2 and 3.

FIG. 8 illustrates the relation of the shutter to the switch SW5 indicated in FIG. 1 through FIG. 3. In FIG. 8, reference numeral 81 indicates the front diaphragm of the shutter; 82 indicates the rear diaphragm of the shutter; 83 indicates an aperture; and 84 indicates a clamping lever provided for the front diaphragm 81. The lever 84 is controlled by the action of the magnet Mg2 indicated in FIG. 3. A reference numeral 85 indicates a clamping lever provided for the rear diaphragm 82. The action of the rear diaphragm clamping lever 85 is controlled by the magnet Mg3 indicated in FIG. 2. Reference symbol SW5 indicates a switch which is also indicated in FIG. 3. The connection to the terminals NC and NO of the switch SW5 is restricted by the rear diaphragm of the shutter.

Figure 9:
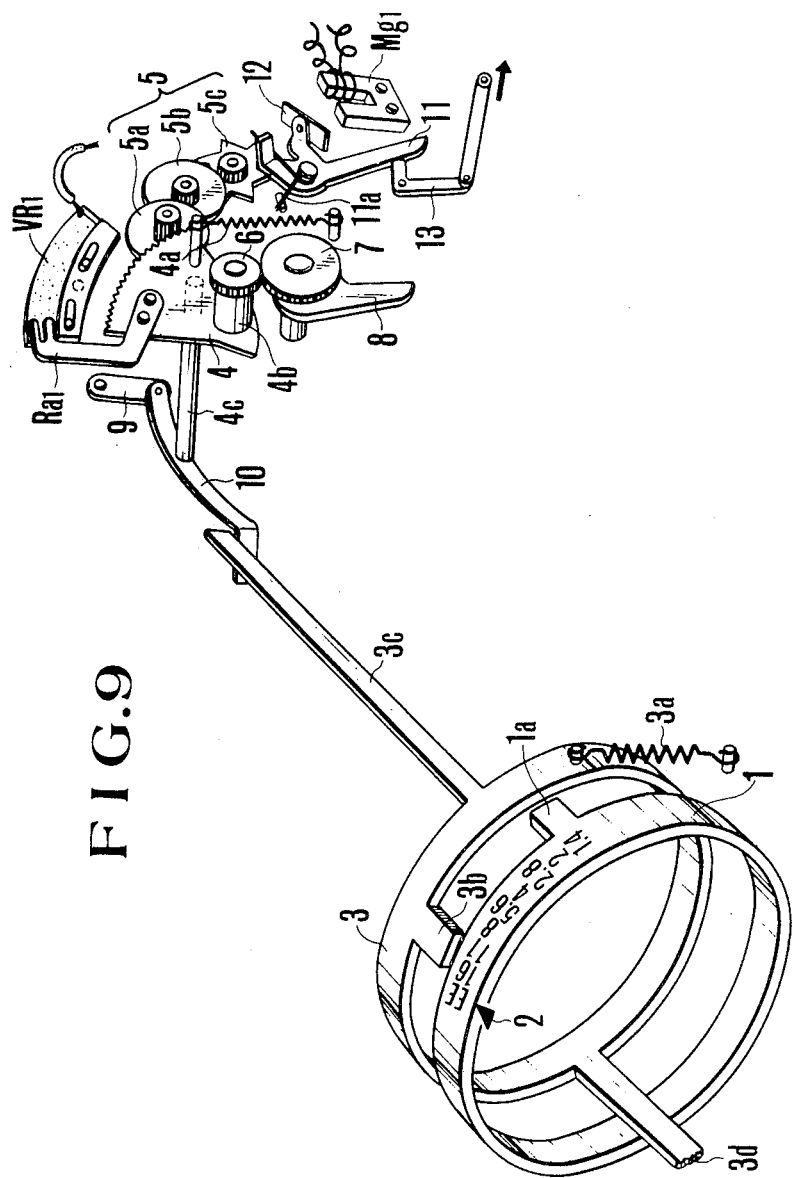
FIG. 9 is a schematic view illustrating, as an example, a lens stop control mechanism which constitutes a camera in combination with the circuits illustrated in FIGS. 2 and 3.

FIG. 9 illustrates an example of a lens stop control mechanism which consists a camera together with the circuits shown in FIG. 1 through FIG. 3. In this drawing, a stop ring 1 is provided with an automatic stop index EE and manual stop indexes respectively carved therein. An index mark 2 is provided for adjustment to the automatic stop index EE or to the manual stop indexes. There is provided a stop preset ring 3 which is urged by a spring 3a to rotate clockwise and is provided with a protrusion 3b for engagement with a protrusion 1a of the stop ring 1. The stop preset ring 3 is also provided with an arm 3c. Furthermore, the ring 3 is provided with a lever 3d which determines the rotation of a bell crank through an unillustrated stop setting cam ring. By this, the rotation of an unillustrated stop drive ring is restricted to determine the opening of the stop. A reference numeral 4 indicates an EE sector gear which is urged to rotate clockwise by a spring 4a having a stronger urging force than the above stated spring 3a. Gears 5a and 5b and a stop wheel 5c which constitute a speed control mechanism 5 engage with the sector gear 4. A slider Ral of the variable resistance VR1 which is provided for determining a preset stop value is attached to the sector gear 4. A reference numeral 46 indicates a shaft of the gear 4. A gear 6 is attached to the shaft 46 while an EE charge gear 7 is arranged to engage with the gear 6. A lever 8 which rotates clockwise in linkage with an unillustrated shutter winding up mechanism is provided coaxially with the gear 7. A pin 4c is attached to the gear 4 with one end thereof secured to a signal lever 10 one end of which is hinged on a supporting lever 9. A bent end of the lever 10 is arranged to engage with the arm 3c. The magnet Mg1 which is mentioned in the foregoing is arranged to attract an iron piece 12 attached to an attraction lever 11. The attraction lever 11 is urged to rotate counterclockwise by a spring 11a while one end of the lever 11 is capable of engaging with the stop wheel 5c of the speed control mechanism 5. A clamping lever 13 is provided for manual operation and is interlocked with an unillustrated operating member to rotate in the direction of an arrow indicated to permit the rotation of the lever 11 for an automatic operation. For manual photographing, the lever 13 is located at the illustrated position to prevent the lever 11 from rotating and thus to permit the manual photographing operation. The wheel 5c engages with the lever 11 in such a manner that the engagement allows the lever 8 to freely rotate clockwise.

Now, referring to the accompanying drawings, the operation of the digital control camera of the present invention is described as follows:

(1) For normal photographing, let us assume that the switch SW5 is in a state of having been shifted from the position NO the NC upon completion of a film winding operation. Under this condition, when an unillustrated shutter release button is depressed as much as the first stroke, the switch which is interlocked with the release button is turned on and, in turn, the transistor Tr1 of the power supply circuit is turned on to bring the circuits illustrated in FIGS. 2 and 3 into operative conditions. The power supply voltage E1 becomes a high level signal "1" (hereinafter a high level signal will be called "1" and a low level signal "0"). By this, the circuits shown in FIGS. 2 and 3 comes into a state of having electric power supply. Then, as described in the foregoing, the light measuring circuit performs a photometric operation. The clock pulse oscillator OSC operates to supply clock pulses to the counter. Furthermore, when the voltage E1 is supplied to the circuits, the capacitor C1 is charged. By this, the transistor Tr2 which has been off is instantaneously turned on. This causes the output of the power up clear circuit 303 to instantaneously become "0". The output of the NAND gate 109 becomes "1" and the counter is preset thereby. The flip-flop circuit 305 is also preset into an initial state wherein its output E2 is "1". By the inversion output $\overline{E2}$, the flip-flop circuit 306 is set into an initial state and its output E3 becomes "1". The flip-flop circuit 307 is set into an initial state by the inversion output $\overline{E3}$ of the output E3 and thus the output E4 of the flip-flop circuit 307 is set to be "1". Through these processes, the preset input to the AD-DA converter 308, i.e. the output of the NAND gate 121, becomes "1" and the counter A-G is preset. Since the output E2 of the flip-flop circuit 305 is "1", the operational amplifier AR4 is controlled thereby and the output of the amplifier is connected to the ground. Under this condition, therefore, the magnet Mg1 which is provided for automatic exposure control (AE for short) is not excited. The outputs E1, E2, E3 and E4 are "1" under the above stated condition. By this, the output of the NAND gate 109 is made to be "0" and the counter 1-20 begins to count while the light emitting diodes LED1 and LED2 which is provided for display make a display. When the camera is used in a manual photographing mode, the switch SW6 is on and the output of the inverter 212 (Iv for short) is thereby made to be "1". Then, when both of the outputs $\overline{Q13}$ and $\overline{Q14}$ of the counter become "1" through the counting operation of the counter, the input to the NAND circuit 116 becomes "1" and the NAND gate produces "0". Then the light emitting diode LED1 is caused through the terminal P9 to produce an output and the diode is lit up to indicate that the photographing operation is being accomplished in a manual mode. Then, if the light coming from a photographing object is less than a standard acceptable value, the information on the number of stopping steps V$\Delta$Av which is supplied from the light measuring circuit to the terminal P12 becomes lower than the standard voltage Vc; and, accordingly, the output of the comparator CP2 becomes "1". When both of the outputs $\overline{Q13}$ and $\overline{Q14}$ of the counter becomes "1" through the counting, all of the inputs to the NAND circuit 115 become "1" and the output of the NAND gate becomes "0". By this, the light emitting diode LED2 which is connected to the terminal P8 is lit up to give warning that the brightness of the photographing object is too low. The light emission of the light emitting diodes LED is made in a flickering manner according to the cycle of the counter and the flickering light is arranged to be visible, for example, inside a view finder.

(2) With the brightness of the photographing object and the automatic or manual mode of the photographing operation having been confirmed in the manner as described in Paragraph (1) above, the photographing operation is started by further depressing the shutter release button to make the second stroke thereof. Then, the switch SW2 is turned on. With the switch SW2 turned on, the output of the inverter 202 becomes "1". Since the switch SW5 is then connected to the contact NC, the output of the inverter 201 also becomes "1". Under this condition, a divided voltage of the power supply voltage E1 and the constant voltage Vc are compared at the comparator CP7. When the value of this divided voltage of the power supply E1 is sufficiently high (ample power supply voltage) as compared with the constant voltage Vc, the output of the comparator CP7 is "1". By these signals, all of the inputs to the NAND gate 107 become "1" and the circuit 107 produces "0". Since this makes the output of the NAND gate 102 to be "1", the flip-flop circuit 305 is inverted and the output E2 thereof changes from "1" to "0". Furthermore, since the base resistances R1 and R2 of the transistor Tr1 are connected to the ground through the terminal P14 with the output of the inverter 203 being changed from "1" to "0" by the output of the NAND gate 102, the transistor Tr1 remains on even after the switch SW1 is turned off and thus power supply to the circuit arrangement is maintained. Since the output E2 of the flip-flop circuit 305 becomes "0" as mentioned in the foregoing, the output $\overline{E2}$ of the inverter 204 becomes "1" and the output of the one shot circuit 304 becomes "0" and remains so for a period of time delayed by the inverters 205, 206 and 207. Accordingly, the output of the NAND gate 109 instantaneously becomes "1" to preset the counter 1-20 again and the outputs $\overline{Q1}$-$\overline{Q20}$ are set at "0". The outputs of the NAND gates 110 and 111, therefore, are "1". Since the output of the NAND gate 112 is thus made to be "0", the output of the NAND gate 113 becomes "1". Then, since the output of the inverter 213 is "1", the output of the NAND gate 104 is "0" and $\overline{E2}$ is changed from "0" to "1". Since the output of the NAND gate 103 is held at "1" by this, the output of the NAND gate 105 is also "1". By this, all of the inputs to the NAND gate 109 becomes "1" after a period of time of one shot and the output of the NAND gate 109 becomes "0". Therefore, the counter begins to count the clock pulses coming from the comparator CP. Furthermore, with the output E2 becoming "0", the control of the operational amplifier AR4 of the AD-DA converter 308 is removed and the output of the amplifier AR4 is released from a grounded state. Since the input $\overline{E2}$ to the NAND gate 121 then changed from "0" to "1", the output thereof changes from "1" to "0", under the condition of the automatic photographing mode (with switch SW6 being off), to put the counter A-G into an operative state. Furthermore, since the output of the NAND gate 119 is "1" and the input $\overline{E2}$ to the NAND gate 121 is also "1" with the counter A-G being preset, the output of the ladder circuit is at a low electric potential; therefore, the output of the operational amplifier AR4 is at a high electric potential; and the output of the comparator CP3 is "1". Since the output of the NAND gate 120 is determined by $\overline{Q1}$, the output of the NAND gate 120 becomes the same as the output $\overline{Q1}$, i.e. a pulse signal of the cycle of $\overline{Q1}$, and the counter A-G performs a countdown operation according to the pulse signal. This cause a stepwise increase of the output of the ladder circuit. When the counter A-G reaches a predetermined value, the input to the + input terminal of the comparator CP3 becomes a value corresponding to V$\Delta$Av. Then, the comparator CP3 is inverted and its output changes from "1" to "0". This causes the NAND gate 120 to produce an output of "1" irrespectively of $\overline{Q}$ and the counter A–G ceases to count; and a digital value corresponding to V$\Delta$Av is stored in the counter A–G. On the other hand, when E2 is inverted from "1" to "0", the operational amplifier AR4 is released from an off state as described in the foregoing. Since the output of the operational amplifier AR4 is then at a high electric potential, the output of the comparator CP1 is inverted from "1" to "0" and the magnet Mg1 is excited to disengage the stop wheel 5c from the lever 11 to which the iron piece 12 is attracted. Then, in the automatic photographing mode, the lever 13 is operated in the direction of an arrow and does not stay in the rotating path of the lever 11. The spring 4a then causes the sector gear 4 to rotate clockwise and the slider Ra1 slides on the resistance VR1. The ring 3 then also rotates together with the rotation of the sector gear 4. Accordingly, the resistance value of the resistance VR1 becomes a value that corresponds to the stop value set by the ring 3. Thus, the resistance value of the resistance VR1 is adjusted with the presetting of the stop value. Therefore, when the resistance value becomes a value corresponding to the output of the operational amplifier AR4 which is controlled as described in the foregoing, i.e. the output corresponding to V$\Delta$Av, the comparator CP1 is inverted and the output of the comparator CP1 again changes from "0" to "1". The magnet Mg1 is then demagnetized to cause the lever 11 to be rotated counterclockwise by the spring 11a. The lever 11 thus comes to engage with the stop wheel 5c. The rotation of the gear 4 is stopped by this and a stop value that corresponds to V$\Delta$Av is determined by determining the rotating degree of the stop preset ring 3. At this moment, the counting operation by the counter A–G for storing a digital value corresponding to V$\Delta$Av and the AE operation by the mechanism shown in FIG. 9 are simultaneously accomplished. However, the counting operation by the counter is completed in a very short period of time compared with the AE operation. Therefore, the AE operation may be considered to be virtually accomplished after completion of the counting operation.

After the stop value is determined in the manner as described above, when a counting operation by the counter 1–20 proceeds until all of the outputs $\overline{Q}8$, $\overline{Q}9$ and $\overline{Q}10$ of the counter 1–20 become "1", the switch SW7 is off, if the photographing is to be performed without using a self-timer. Then, the output of the inverter 208 is off and that of the inverter 209 is "1". Therefore, the output of the NAND gate 111 changes from "1" to "0" and that of the NAND gate 112 from "0" to "1". The output of the NAND gate 104 then becomes "1". Since $\overline{E2}$ is "1" as mentioned in the foregoing, the output of the NAND gate 103, namely E3, is inverted from "1" to "0". This causes $\overline{E3}$ to change from "0" to "1"; the output of the NAND gate 118 changes from "1" to "0"; the magnet Mg2 which is provided for starting the camera is excited; a clamp 84 applied to the front diaphragm of the shutter is released from clamping to allow the front diaphragm to run; and an photographing operation begins. Following this, when the counting by the counter further proceed until both of the outputs $\overline{Q}7$ and $\overline{Q}9$ become "1", the NAND gate produces "0" and the NAND gate 118 produces "1". By this, the magnet Mg2 is demagnetized to prevent unnecessary consumption of power. With the NAND gate producing "0", E4 is inverted from "1" to "0"; the output of the NAND 109 is inverted from "0" to "1"; and, by this, the counter 1–20 is placed in a preset state; and the sequence of the photographing operation through the counting operation of the counter 1–20 is completed at this point of time. As already mentioned, the switch SW4 shown in FIG. 2 is turned off by the travel of the front diaphragm of the shutter. Then, the capacitor C5 is charged through the resistances VR5 and VR6; the comparator CP6 compares the output of the capacitor C5 and the divided voltage of the resistances R26 and R27; and the magnet Mg3 is demagnetized after a preset length of time to allow the rear diaphragm of the shutter to complete the photographing operation. In this manner, the switch SW5 which is interlocked with the rear diaphragm of the shutter is shifted from one side NC to another side NO by the travel of the rear diaphragm upon completion of the photographing operation. Then, a shutter winding operation is performed by the motor drive device.

Meanwhile, with the switch SW5 having been shifted to the side NO, the output of the inverter 201 becomes "0"; the flip-flop circuit 305 is inverted to change E2 from "0" to "1"; and the output of the inverter 203 also changes from "0" to "1". Accordingly, with the switch SW1 being off, the transistor Tr1 of the power supply circuit is turned off; and thereby the power source is relieved from a power supply keeping state. Furthermore, with E2 becoming "1", $\overline{E2}$ becomes "0"; the flip-flop circuit 306 is inverted; and E3 becomes "1". The flip-flop circuit 307 is also inverted to change E4 to "1" and the output of the NAND gate 109 changes from "1" to "0". In this manner everything is reset.

Also, with the switch SW5 connected to the side NO, the relay RL1 shown in FIG. 4 operates to shift the switch SM1 from its normally connected side NC to another side NO; the motor M rotates; and an unillustrated shutter winding mechanism then operates to wind up the shutter. With the shutter charged by the winding mechanism, the switch SW5 is again shifted from the side NO to the side NC; the relay RL1 becomes inoperative; the switch SW1 is again connected to the side NC; the motor M ceases to rotate; and the camera is brought back into a ready-for-photographing state. The photographing operation is completed through the above mentioned processes and now these processes can be repeated by releasing the shutter for next photographing.

What is described in the foregoing represents a noncontinuous photographing operation. For continuous photographing, the unillustrated shutter release button is continuously depressed and is kept in a depressed state. Accordingly, the switches SW1 and SW2 are kept in an on condition. The shutter is wound up and the switch SW5 is again connected to the side NC. Then, the output of the inverter 201 is inverted from "0" to "1". Since the output of the inverter 202 is also "1", the output of the NAND gate 107 becomes "0" and the output of the NAND gate 102 becomes "1". All of the inputs to the NAND gate becomes "1". Therefore, E2 is inverted from "1" to "0". By this, $\overline{E2}$ is inverted from "0" to "1" and then, as described in the foregoing, the one shot circuit 304 instantaneously produces an output "0". The NAND gate 109 also instantaneously produces an output "1". Then, an AE operation follows as described in the foregoing. The lens stop is determined; the counter 1–20 proceeds with counting; and, when all of the outputs Q8, Q9 and Q10 become "1", E3 changes from "1" to "0". Then, the magnet Mg2 is excited to let the shutter start for continuous photographing.

In the above described operation for continuous photographing, when the switch SW5 is shifted from the side NO to the side NC, E2 is inverted from "1" to "0" for repeated photographing. However, since a mechanical switch is employed as the switch SW5, it is possible that chattering results from shifting of the switch. Such chattering then might cause E2 to unstably change between "1" and "0" and this might cause an erroneous circuit operation. To solve such a problem, in this particular embodiment example of the invention, therefore, the counter 1-20 does not begin to count immediately after the inversion of E2 from "1" to "0" but begins to count after a period of time determined by a one shot circuit 304. The counting operation thus will not begin during this period of time irrespective of the condition of E2. Between the start of the one shot circuit 304 and the inversion thereof, there is a period of about 10 ms while the chattering time of switch SW5 is 2 to 3 ms. Therefore, the switch SW5 is stabilized after the inversion of the one shot circuit until the beginning of counting by the counter, so that the chattering problem is completely solved.

In the series of processes described in the foregoing, if the voltage of the power source is below a standard value, the output of the comparison circuit CP7 becomes "0"; therefore, the output of the NAND gate 107 is kept at "1" even when the switch SW2 is turned on; and E2 is also kept at "1". Therefore, there takes place no control operation for an AE operation, shutter release, etc. so that no erroneous photographing operation will results from decrease in the power source voltage.

The above description relates to photographing in an automatic photographing mode. For the manual mode of photographing, an unillustrated mode selecting member is operated to turn on the switch SW6 shown in FIG. 3; a desired lens stop value is selected by means of the ring 112 shown in FIG. 9 with the stop value graduation adjusted to the index 2; and, by this, the stop preset ring is brought into engagement with the protrusion 1a of the ring 1 and the protrusion 3b of the ring 3 to make the rotating degree of the ring 3 correspond to the designated stop value. With a lens stop value determined beforehand and the lever 13 set in a state as illustrated in the drawing, a manual photographing operation can be accomplished by effecting shutter release. When shutter is released, the switch SW1 is turned on in the same manner as in the above described mode of automatic photographing. Then E1 becomes "1" to make each circuit operative. Following this, E2 through E4 become "1". As mentioned in the foregoing, the output of the NAND gate 109 changes from "1" to "0" and the counter 1-20 counts the pulses coming from the pulse oscillator OSC. Also as mentioned in the foregoing, when the brightness of a photographing object is below a standard value, the output of the comparator CP2 shown in FIG. 3 is "1" and E2 is "1". The output of the NAND gate 115, therefore, repeat changing between "1" and "0" according to the outputs $\overline{Q}13$ and $\overline{Q}14$ of the counter. The light emitting diode LED2 flickers thus giving a warning against the photographing operation for insufficient brightness of the object. Since the switch SW6 is on at this time, the output of the NAND gate repeats changing between "1" and "0" according to the counter outputs $\overline{Q}13$ and $\overline{Q}14$. The light emitting diode LED1 flickers to indicate the manual mode of photographing. After that, when the unillustrated shutter release button is depressed, the switch SW2 is turned on and, as described in the foregoing, E2 is inverted from "1" to "0". The counter 1-20 is again preset and a count down operation again takes place from the preset condition. Then, with E2 inverted from "1" to "0", the NAND gates 115 and 116 produces outputs "1" and the display by the light emitting diodes LED1 and LED2 is completed. Furthermore, as mentioned in the foregoing, the inversion of E2 causes the operational amplifier AR4 to be released from an off condition and the input signal $\overline{E}2$ to the NAND gates 121 and 120 to be inverted from "0" to "1". However, since the switch SW6 is on, the output of the NAND gate 121 is kept at "1" and the counter A-G does not count. Therefore, the digital value of V$\Delta$Av is not stored in the counter A-G. Meanwhile, the output of the comparison circuit CP1 is inverted and the magnet Mg1 is excited. However, as mentioned in the foregoing, the lever 13 shown in FIG. 9 is in the rotating path of the lever 11 to prevent the lever 11 from rotating. The gear 4, therefore, does not rotate and the stop preset ring 3 is kept at the same position of the preset stop value. Following this, when the counting by the counter 1-20 proceed until all of the counter outputs $\overline{Q}8$, $\overline{Q}9$ and $\overline{Q}10$ become "1", the magnet Mg2 is excited to cause the front diaphragm of the shutter to travel for photographing. After a preset period of time, the rear diaphragm of the shutter travels to complete the photographing.

For a self-timer photographing, either in the automatic or manual photographing mode, the switch SW7 is turned on by means of an unillustrated operating member. Then the shutter releasing operation is performed to turn on the switch SW2. The output of the NAND gate 117 is determined by the outputs $\overline{Q}14$ and $\overline{Q}15$ of the counter 1-20 during a period of time from the inversion of E2 from "1" to "0" until the inversion of E3 from "1" to "0" takes place. The output of the NAND gate 117 thus repeats change between "1" and "0" to cause the light emitting diode LED3 to indicate a self-timer photographing operation. Since the switch SW2 is on, the counter 1-20 is preset. With the counter proceeding with counting from this condition, the shutter is not released even when the counter outputs $\overline{Q}8$, $\overline{Q}9$ and $\overline{Q}10$ become "1". Then, with the counter further proceeding with counting, when the counter outputs $\overline{Q}18$ and $\overline{Q}20$ also become "1", the NAND gate 110 produces "0" to make the output of the NAND gate 112 change to "1". This inverts E3 from "1" to "0" to finally allow the shutter to be released. In this manner, the shutter is released after a long period of time for a self-timer photographing as compared with the period of time normally required for ordinary photographing.

As described in detail in the foregoing, the digital control camera of the present invention is provided with a counter. The counting operation of the counter is divided into a counting operation for display and a counting operation for photographing control. The counting operation for display is started with the contents of the counter having been preset. Upon completion of display, the counter is again preset. Then, again the counting is started from a preset condition and the control over the photographing operation is accomplished according to the contents of the counter. This counter is capable of supplying signals for display and control actions with a small number of bits. Furthermore, in accordance with this invention, the photographing operation is stopped when the power source voltage drops, so that an erroneous action due to decrease in the power source voltage can be prevented; the counted value obtained from the same counter can be used for controlling both a self-timer photographing operation and ordinary photographing, so that a self-timer photographing is made possible with an extremely simplified construction of the camera; and, for continuous photographing with a motor drive device, the camera remains unaffected by the chattering that tends to take place in such a photographing operation.

What is claimed:

1. A digital control camera comprising:
   a pulse oscillator;
   counting means which counts the pulses derived from the pulse oscillator;
   a display circuit which displays photographic information,
   connecting means for connecting the display circuit with the counting means and for causing the display operation of the display circuit to be controlled according to the counted value obtained by the counting means;
   release operating means for effecting a shutter release operation;
   a start signal forming circuit coupled to the release operating means for producing a photographing operation start signal, said connecting means responding to the start signal by disconnecting the display circuit from the counting means;
   a counter setting circuit connected to the counting means for setting the contents of the counting means into an initial state in response to the photographing operation start signal; and
   a light measuring circuit for producing an analog output corresponding to the brightness of an object to be photographed;
   an A-D conversion circuit connected to the light measuring circuit for converting an analog output from the light measuring circuit into a digital output, said A-D conversion circuit becoming operative in response to the signal from the signal forming circuit;
   an exposure control circuit for defining an exposure control amount based on the digital output of the A-D conversion circuit;
   a shutter release signal forming circuit operative in response to the start signal and connected to the counting means to produce a shutter release signal when the value counted by the counting means reaches a preset value, said shutter release signal forming circuit being set in such a manner that the length of time required for counting by the counting means from the moment when the counting means is set at its initial state to the moment when its counting value reaches the predetermined value is longer than the length of time required for analog-to-digital conversion by the A-D conversion circuit; and
   shutter means which operates in response to the shutter release signal from the shutter release signal forming circuit and which opens a shutter in response to the shutter release signal.

2. A digital control camera comprising:
   a pulse oscillator;
   a counting means which counts the pulses derived from the pulse oscillator;
   a light measuring circuit for producing an analog output corresponding to the brightness of an object to be photographed;
   a warning signal producing circuit for producing a warning signal when the analog output is not suitable for proper exposure;
   a display circuit which displays a warning that the brightness is unsuitable for exposure;
   connecting means for connecting an output terminal of said counter means with said display circuit, said connecting means becoming operative in response to the warning signal, whereby the display circuit is caused to flicker for warning when the warning signal is produced;
   release operation means for effecting a shutter release operation;
   a signal forming circuit which produces a photographing operation start signal when the release operation means is operated;
   said connecting means disconnecting said display means from said counter means for terminating the flickering operation in response to the signal from the signal forming circuit;
   a counter setting circuit which is connected to the counting means for setting the contents of the counting means into an initial state in response to the signal from the signal forming circuit;
   an A-D conversion circuit connected to said light measuring circuit and to said counter means for converting an analog output of the light measuring circuit into a digital value by means of pulses derived from the output terminal of said counter means;
   a diaphragm control means which controls a diaphragm according to an output derived from the A-D conversion circuit;
   a shutter release signal forming circuit which is responsive to the start signal and which is connected to the counting means to produce a shutter release signal when the value counted by the counting means reaches a preset value, the time duration between the moment when the counter means is set into an initial state and the moment when contents of the counter means reach the predetermined value being longer than the time duration required for an A-D conversion operation; and
   shutter means which operates in response to the shutter release signal.

3. A digital control camera comprising:
   (a) a pulse oscillator;
   (b) a counting means which counts the pulses derived from the pulse oscillator;
   (c) a first shutter release signal forming circuit which is connected to the counting means to form a shutter release signal when the value counted by the counting means reaches a certain value;
   (d) a second shutter release signal forming circuit which is connected to the counting means to form a shutter release signal when the value counted by the counting means has further increased from said certain value by a preset number of count;
   (e) a selecting means for selecting either the first or the second shutter release signal forming circuit and for making the selected circuit operative; and
   (f) a shutter means which opens a shutter in response to the shutter release signal produced either by the first or the second release signal forming circuit;

the shutter release being made after an ordinary period of time when the first shutter release signal forming circuit is selected by the selecting means and after a longer period of time when the second shutter release signal forming circuit is selected for a self-timer photographing operation.

4. A digital control camera according to claim 3 including a display output forming circuit which is connected to said selecting means to produce an output when said second shutter release signal forming circuit is selected by the selecting means; and a display means which lights up for display according to an output derived from said display output forming circuit, the display output forming circuit being arranged to stop the display by inverting the output condition thereof in response to said shutter release signal.

5. A digital control camera according to claim 4 wherein said display output forming circuit is connected to an applicable output terminal of said counting means to produce an output in a cycle corresponding to the output pulses derived from the output terminal, the output of the display output forming circuit causing the display means to flicker for display.

6. A digital control camera comprising:
(a) a power source;
(b) a warning signal forming circuit which detects the voltage of the power source and which produces a warning signal when the voltage drops to a value less than a preset voltage value;
(c) a photographing operation start signal forming means which produces a signal for starting a photographing operation;
(d) a sequence control circuit which produces control signals in time sequence for controlling photographing sequence operations; and
(e) a control circuit which is responsive to the signal from said photographing operation start signal forming means and which produces a signal to render said sequence control circuit operative for starting control over a sequence of photographing actions, said control circuit being arranged not to produce the signal when said warning signal is issued,
the control signal thus being not produced when the voltage of the power source drops and no photographing operation being performed under such a condition.

7. A digital control camera according to claim 6 wherein said photographing operation start signal forming means being a switching means which is interlocked with a shutter release means.

8. A digital control camera comprising:
(a) a pulse oscillator;
(b) counting means which counts the pulses derived from the pulse oscillator;
(c) a display circuit which displays photographic information, the display operation of the display circuit being controlled according to the counted value obtained by the counting means;
(d) a photographic operation start signal forming circuit which produces a photographic operation start signal when a photographic operation is to be started;
(e) a counter setting circuit which is connected to the counting means for setting the contents of the counting means into an intitial state in response to the photographic operation start signal;
(f) a diaphragm control circuit which operates in response to said photographic operation start signal and also to an output signal derived from an applicable output terminal of the counting means;
(g) a shutter release signal forming circuit which is responsive to the photographic operation start signal and which is connected to the counting means to produce a shutter release signal when the value counted by the counting means reaches a preset value;
(h) shutter means which operates in response to the shutter release signal derived from the shutter release signal forming circuit and which opens a shutter in response to the shutter release signal;
(i) a warning circuit for detecting the voltage of a power source and producing a warning signal when the voltage of the power source drops below a preset voltage value;
(j) said photographic operation start signal forming circuit being responsive to said warning circuit and arranged not to produce the photographic operation start signal when said warning signal is issued, so as to permit only the display action and inhibit photographic operation when the power source voltage drops below the preset value.

9. A digital control camera comprising:
a pulse oscillator;
counting means which counts the pulses derived from the pulse oscillator;
a display circuit which displays photographing information;
connecting means for connecting the counting means with the display circuit, the display operation of the display circuit being controlled according to the counted value obtained by the counting means;
a release operation switch for shutter release;
a signal forming circuit which produces a photographing operation start signal when the release operation switch is operated;
a counter setting circuit which is connected to the counting means and the signal forming circuit for setting the contents of the counting means into an initial state in response to the start signal;
a light measuring circuit which produces an analog output corresponding to the brightness of an object to be photographed;
an A-D conversion circuit for analog-to-digital conversion of the output of said light measuring circuit, the A-D conversion circuit comprising:
a second counter,
D-A conversion means which produces an analog value corresponding to a value counted by the second counter,
a comparison circuit which compares the output of said light measuring circuit and the output of the D-A conversion means and which produces an A-D conversion completion signal when the two outputs reach a preset relation, and
a control circuit which is connected to said counting means and said signal forming circuit to transfer a pulse signal obtained from said output terminal of the counting means to the second counter in response to the start signal, said control circuit being arranged to stop transferring the pulse signal to the second counter in response to the A-D conversion completion signal; and
a diaphragm aperture control means which controls the aperture value according to the contents of the second counter; a shutter release signal forming circuit connected to a certain output terminal of the counting means, said circuit becoming operative in response to the signal from signal forming circuit to produce a shutter release signal when the value counted by the counting means reaches a predetermined value, the time duration between the moment when the counting means is set into an initial state and the moment that contents of the counting means reach the predetermined value is longer than the time duration required for full counting by the second counter; and shutter means for opening a shutter in response to the shutter release signal.

10. A camera, comprising:
(a) a light measuring circuit for producing an electrical signal corresponding to the brightness of an object;
(b) a memory circuit for memorizing an electrical signal corresponding to the electrical signal of the light measuring circuit;
(c) a shutter mechanism;
(d) a photographic control circuit having an exposure control circuit for controlling an exposure factor on the basis of the electrical signal memorized in the memory circuit and for producing a closing signal for closing the shutter mechanism at an end of a film exposure, said photographic control circuit including means for producing a reset signal to reset the electrical signal memorized in the memory circuit when the shutter mechanism is operated.

11. A camera, comprising:
(a) a light measuring circuit for producing an electrical signal corresponding to the brightness of an object;
(b) a memory circuit for memorizing an electrical signal corresponding to the electrical signal of the light measuring circuit;
(c) a photographic operation control circuit for producing a signal for closing a shutter mechanism to end a film exposure, said control circuit including an exposure control circuit for controlling an exposure on the basis of the electrical signal memorized in the memory circuit; and
(d) reset signal forming means for producing a reset signal for resetting the electrical signal memorized in the memory circuit when a photographic operation controlled by said operation control circuit is terminated.

12. A camera, comprising:
(a) release operating means having a rest state and first and second states during operation;
(b) first switch means for assuming a first switching condition when the release operating means is in the rest state and a second switching condition when the release operating means is translated from the rest state into the first state, said switch means being arranged for remaining in the second switching condition when the release operating means is in the first state and for returning to the first switch condition when the operation of the release operating means ends;
(c) second switch means for being shifted from a first switching condition to a second switching condition when the release operating means is operated to shift from the rest state to the second state through the first state, for being in the second switching condition when the release operating means is in the second state, and for shifting into the first switching condition when the operation of the release operating means ends;
(d) a camera circuit for controlling a photographic operation and for starting operational control of an exposure control when the release operating means assumes the second operating state;
(e) electrical switching means connectable to a power source and the camera circuit, said electrical switching means having a control electrode and being arranged to become conductive when a signal is applied to the control electrode and remaining conductive while the signal is being applied to the control electrode, said electrical switching means being coupled with the first switch means so that when the first switch means is in the second switching condition the signal is applied to the control electrode and said electrical switching means becomes conductive so as to supply current to the camera circuit, so that the current is supplied to the camera circuit by placing the release operating means in the first state and is prevented when the operation of the release operating means ends in such a manner that the release operating means is shifted from the first to the rest state; and
(f) a holding circuit for holding the signal applied to the control electrode, said circuit being operated when the second switching means assumes the second switching condition so as to hold the signal independent of the condition of the second switch means until the photographic operation is completed and so that after the release operating means has been shifted into the second state the current is kept supplied to the camera circuit until the photographic operation is completed even if the operation of the release operating means ends.

13. A digitally controlled camera, comprising:
a pulse generator for producing pulses;
counting means for counting pulses from said pulse generator;
a first shutter release signal forming circuit coupled to said counting means for forming a shutter release signal when a value counted by the counting means reaches a given value;
a second shutter release signal forming circuit coupled to the counting means for forming a shutter release signal when the value counted by the counting means has further increased from said given value by a predetermined number of counts;
selecting means for selecting either the first or the second shutter release signal forming circuits and for rendering the selected circuit operative;
shutter means for opening a shutter in response to the shutter release signal produced either by the first or the second release signal forming circuit after a first period of time when the first shutter release signal forming circuit is selected by the selecting means and after a longer period of time when the second shutter release signal forming circuit is selected for a self-timer photographic operation; and
indicator means for indicating that the selecting means has selected the second shutter release forming circuit.

14. A digitally controlled camera, comprising:
means connectable to a power source;

a warning signal forming circuit for detecting the voltage at the means connectable to the power source and for producing a warning signal when the voltage drops to a value less than a preset voltage;

photographic operation start signal forming means for producing a signal for starting a photographic operation;

sequence control circuit means for producing control signals in time sequence to control photographic sequence operations; and a control circuit responsive to the signal from the photographic operation start signal forming means and for producing a signal to render said sequence control circuit operative to start control over a sequence of photographic actions and for preventing the signal when the warning signal is issued so that the control signal is absent when the voltage at the power source connecting means drops and a photographic operation is prevented under such condition.

15. A camera comprising:
(a) a control circuit for controlling a picture recording operation, said circuit being adapted to be operated by a voltage supplied from a power source;
(b) a self-timer circuit for delaying the starting operation of the picture recording with the control circuit by a predetermined time in the self-timer mode;
(c) indicator means presenting a first indicating condition for indicting the operation of the self-timer delay circuit;
(d) a voltage detecting circuit for detecting the voltage of the power source and producing a signal presenting the voltage condition of the power source, the indicator means being connected to said detecting circuit and presenting an indicating condition different from the first indicating condition in response to the signal.

* * * * *